(12) United States Patent
Schmidt

(10) Patent No.: US 6,871,431 B2
(45) Date of Patent: Mar. 29, 2005

(54) LICENSE PLATE HAVING CAPTIVE THUMB SCREW FASTENER

(76) Inventor: Tyson Schmidt, 5080 S. Gera Rd., Frankenmuth, MI (US) 48734

( * ) Notice: Subject to any disclaimer, the term of this patent is extended or adjusted under 35 U.S.C. 154(b) by 0 days.

(21) Appl. No.: 10/394,331

(22) Filed: Mar. 21, 2003

(65) Prior Publication Data

US 2003/0182828 A1 Oct. 2, 2003

Related U.S. Application Data

(60) Provisional application No. 60/368,330, filed on Mar. 28, 2002.

(51) Int. Cl.[7] .............................................. G09F 7/00
(52) U.S. Cl. ........................ 40/200; 411/512; 411/112
(58) Field of Search .................. 40/200, 209; 411/360, 411/511, 111, 112, 113, 107, 103, 104, 109, 512

(56) References Cited

U.S. PATENT DOCUMENTS

| | | | | |
|---|---|---|---|---|
| 1,541,518 A | * | 6/1925 | McCain | 411/409 |
| 2,305,427 A | * | 12/1942 | Joachim | 411/409 |
| 3,126,935 A | * | 3/1964 | Touzzo | 411/352 |
| 3,584,407 A | * | 6/1971 | Vrooman | 40/209 |
| 3,756,641 A | * | 9/1973 | Dugan | 292/258 |
| 5,094,579 A | * | 3/1992 | Johnson | 411/107 |
| 2003/0175091 A1 | * | 9/2003 | Aukzemas et al. | 411/107 |

* cited by examiner

Primary Examiner—Mark T. Le
(74) Attorney, Agent, or Firm—Howard & Howard

(57) ABSTRACT

A mounting kit for securing a license plate removably to a vehicle includes a pair of fasteners having a tapered screw thread shank, a hand-turnable fastener head, and a grommet captured between the head and the screw thread portion. The grommet is installable in an associated fastener opening of a license plate to capture the grommet within the fastener hole and in turn to capture the fasteners within the grommet, while enabling the fasteners to be turned relative to the grommets and license plate for releasably mounting the plate on the vehicle.

11 Claims, 3 Drawing Sheets

LICENSE PLATE HAVING CAPTIVE THUMB SCREW FASTENER

This application claims the benefit of U.S. Provisional Application No. 60/368,330, filed Mar. 28, 2002.

BACKGROUND OF THE INVENTION

1. Technical Field

The invention relates generally to thumb screw fasteners, and more particularly to those employing a keeper for retaining the screw on an object to be fastened to another structure.

2. Related Art

Referring to the enclosed drawings of FIGS. 1–4, a standard license plate is shown at 10 having a set of fastener mounting holes 12 which normally receive cap screws used to attach the plate 10 to a vehicle 13, which typically is outfitted with nylon bushings 15 having a threaded bore 17 to receive the fasteners. Presently, there is no standardized thread diameter or thread pattern that would be universal among the various car manufacturers. Accordingly, a standard license plate cap screw for a General Motors vehicle will likely not fit in the nylon bushing of a Chrysler vehicle. This presents a problem for car dealers and others who move dealer or temporary transport plates from one vehicle to another on a regular basis since, if the vehicle is missing its standard cap screws for the license plate, the dealer must search around for the appropriate size screws and even then must have a screw driver or other device handy to screw and unscrew the cap screws, which are intended to provide semi-permanent mounting support of the plate for a vehicle owner.

SUMMARY OF THE INVENTION

What the invention proposes is a universal fastener which mounts on and is captured by the license plate and which has a thread form enabling the fasteners to be mounted in a variety of hole sizes to accommodate the range of possibilities among the various car manufacturers.

According to the invention, a mounting kit for releasably securing a license plate to a vehicle includes a pair of fasteners each having a fastener head and a shank extending axially from the head. The shank has a tapered thread portion which narrows toward a free end of the shank and a non-threaded portion between the threaded portion and fastener head about which an elastically deformable grommet is disposed. The grommet has a pair of spaced flanges which enable the grommet to be installed and captured within a fastener opening of a license plate while supporting the fastener for rotation relative to the grommet and license plate. The fastener head has a pair of wing projections which enable the fasteners to be turned by hand without the assistance of tools.

In use, the user installs the grommets within the fastener holes of the license plate and captures the fasteners within the grommet, such that the fasteners are retained on the license plate by the grommet even when the license plate is not mounted on the vehicle. To mount the license plate, the user simply aligns the threaded end with associated bores of the vehicle and then turns the fasteners by hand to advance the threaded portion into associated bores of the vehicle. According to a preferred feature of the invention, the threads have a form which enables the fasteners to be fully extended with no more than 2.5 turns of the fastener. According to a further preferred feature, the unthreaded portion is formed with stop flanges which limit the depth to which the threaded portion can be extended into the bores.

BRIEF DESCRIPTION OF THE DRAWINGS

The presently preferred embodiment of the invention is disclosed in the following description and in the accompanying drawings, wherein.

DETAILED DESCRIPTION

Figure 1:
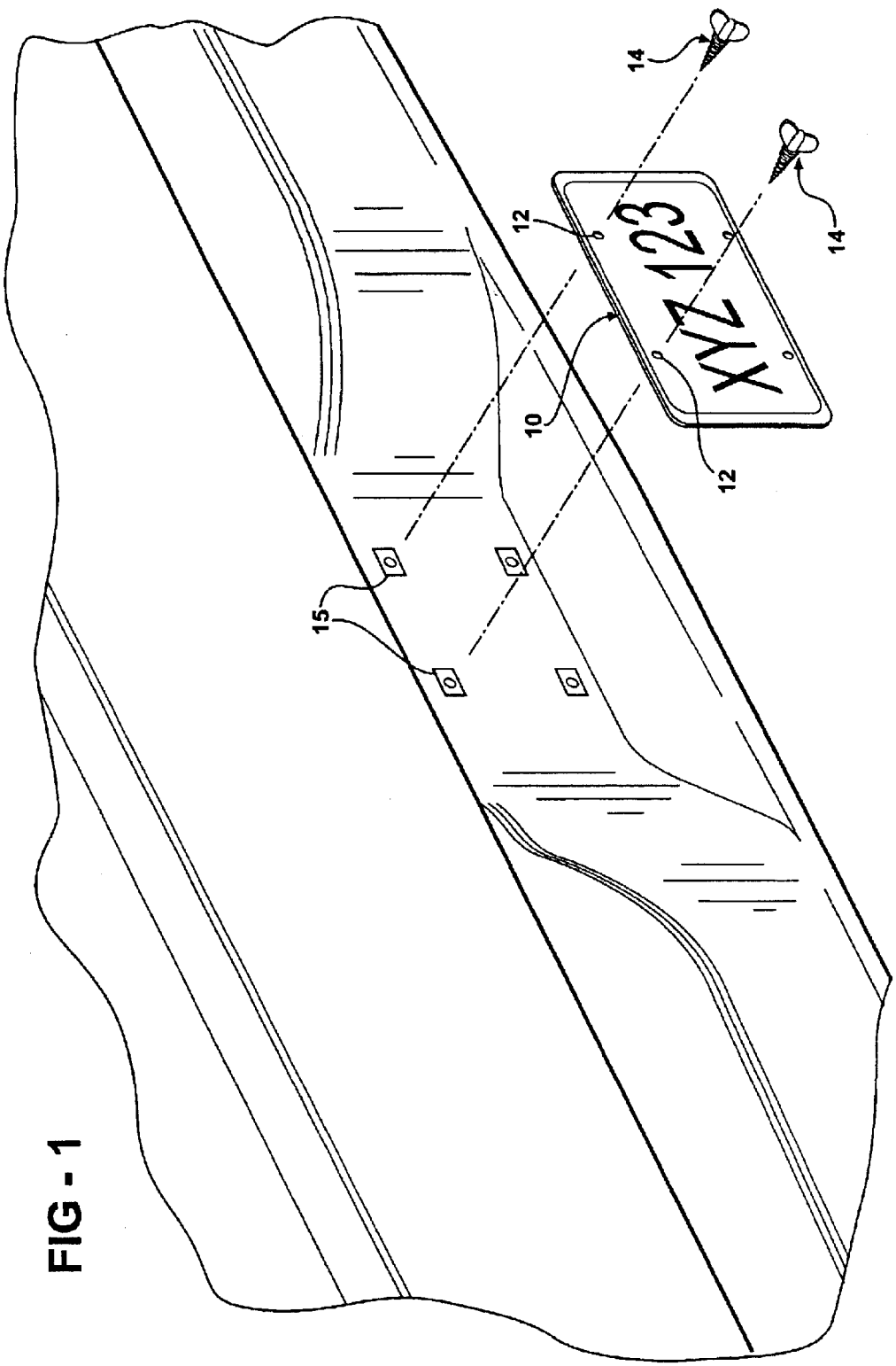
FIG. 1 is an exploded prospective view of the mounting kit and a vehicle.
Figure 2:
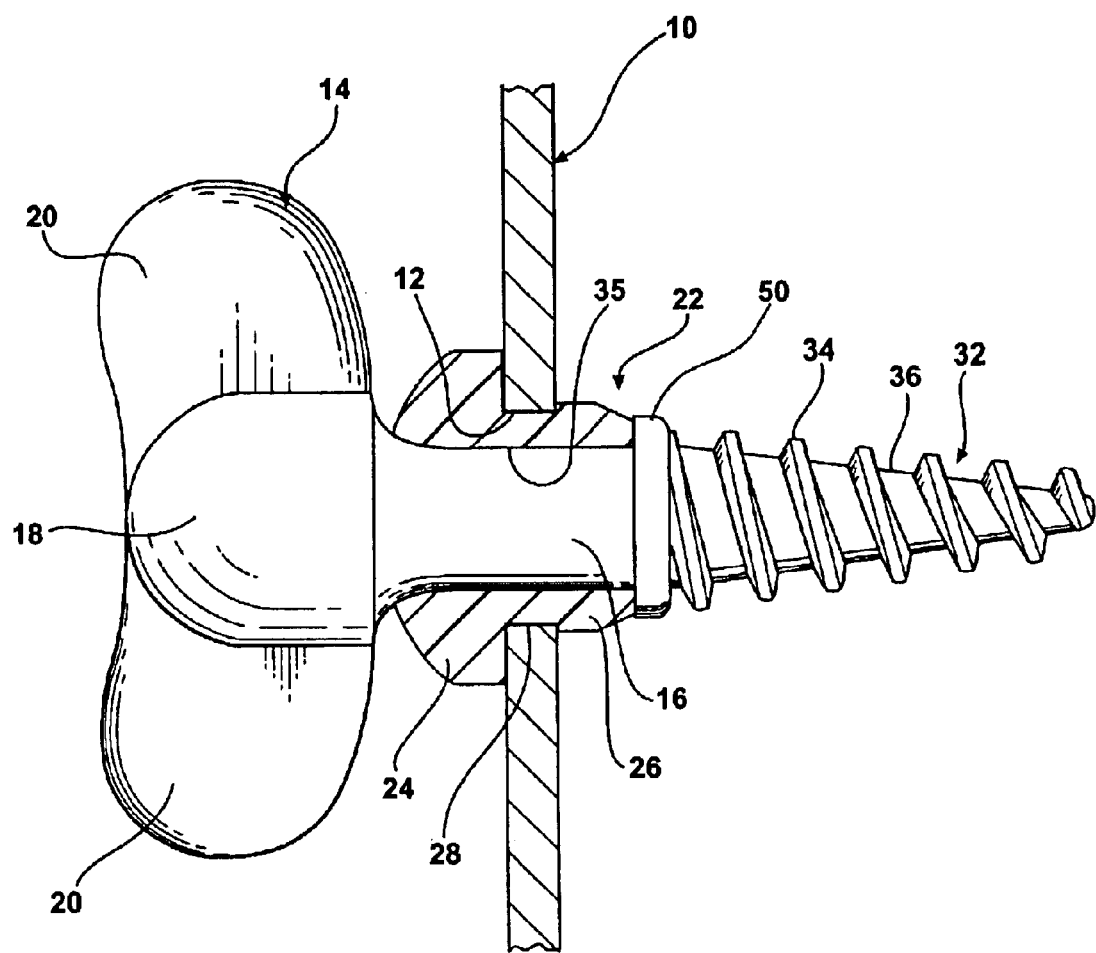
FIG. 2 is a fragmentary sectional view of the fastener shown mounted to a license plate in use.
Figure 3:
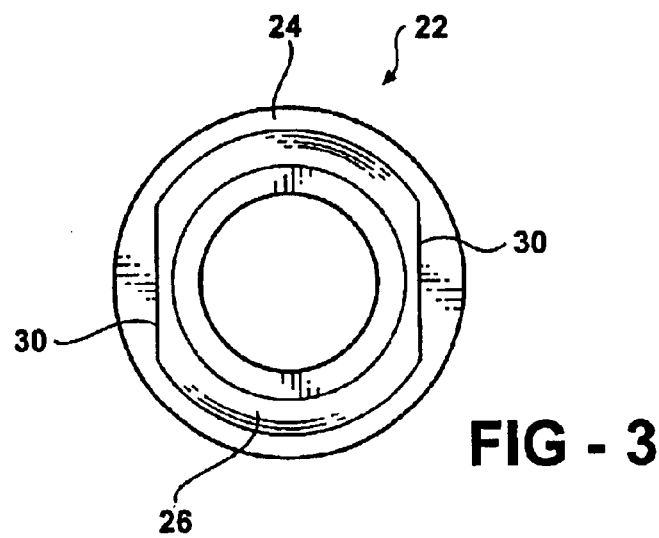
FIG. 3 is a plan view of the grommet.

Turning more particularly to FIGS. 1 and 2, the thumb screw fasteners 14 each have a shank with an unthreaded portion 16 which mounts a head 18 at one end extending from which are a pair of opposed wings 20 (much like a wing nut head). The unthreaded portion 16 mounts a rubber keeper grommet 22 having an upper annular flange 24 considerably larger than the holes 12 in the plate 10, and a lower annular flange 26 sized considerably smaller than that of the upper flange 18, and slightly larger in diameter than that of the smallest dimension of the holes 12 to accommodate the passage of the smaller flange 26 through the holes 12 of the license plate 10. The grommet 22 is fabricated out of a resiliently deformable elastomer, such as rubber, PVC compound #6712, or the like. The lower flange 26 is spaced from the upper flange 24 to provide an annular slot 28 in the grommet 22 bordered on either side by shoulders presented by the upper 24 and lower 26 flange portions. The slot 28 has a width corresponding to that of the license plate 10. Turning to FIG. 3, the smaller flange 26 is additionally formed with opposed flats 30 which facilitate the elastic deformation of the flange 26 to a size which enables the grommet 22 to be fairly easily installed through the opening 12 and thereafter recover to shape so that the grommet 22 is captured in the opening 12. Once installed, a threaded end 32 of the screw 14 is extended through a central opening 35 in the grommet 22. The head 18 of the screw 14 captures the screw 14 on one side of the grommet 22, and threads 34 formed on the threaded end 32 capture the screw 14 at the other end of the grommet 22. In this way, the screw 14 is captured by the grommet 22 and thus retained against normal removal from the plate 10. During installation of the screw through the grommet 22, the inner wall 35 of the grommet expands elastically to accommodate the passage of the relatively larger diameter threaded end 32, after the passage of which the grommet returns to its original shape about the unthreaded shank 16 of the screw 14. The grommet 22 may be slightly expanded about the unthreaded shank 16 so as to provide a constricting gripping force to the shank 16. Alternatively, the grommet 22 can be mounted about the fasteners 14 and thereafter installed in the holes 12 of the license plate 10.

Figure 4:
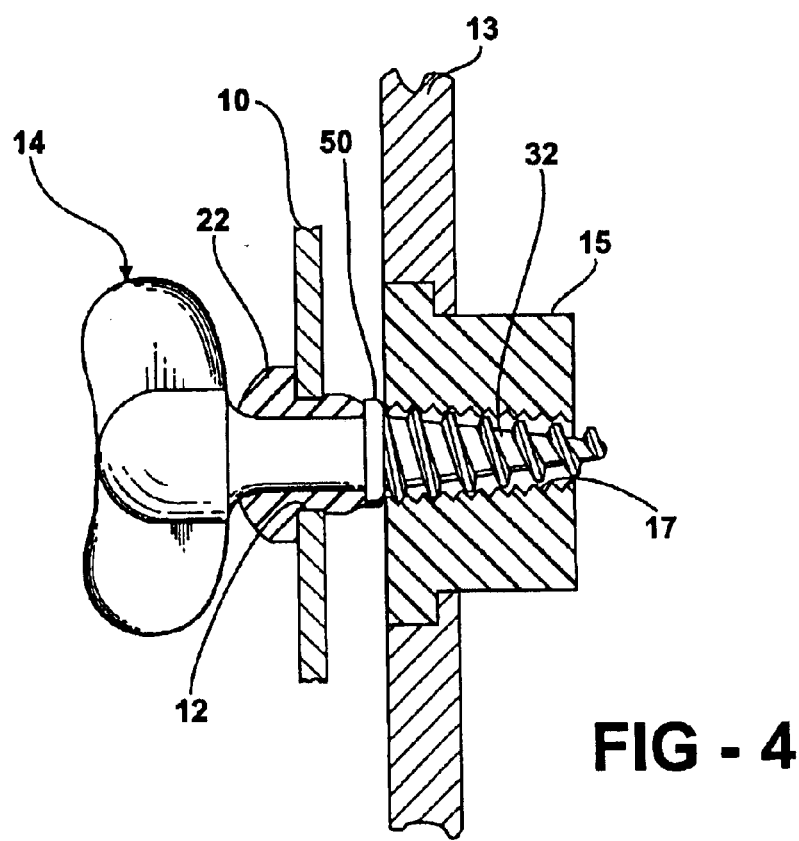
FIG. 4 is a fragmentary sectional view of one of the fasteners shown mounting the license plate on the vehicle.

With the fasteners 14 retained on the plate 10, the plate 10 is easily mounted on a vehicle as shown in FIG. 4 by extending the tapered threaded end 32 into the nylon bushings 15 of the vehicle 13, with the screw 14 rotating relative to the grommet 22 by application of a bodily turning force applied to the wings 20 by the hands of the installer. No tools are required.

The tapered threaded end 32 is designed to grip the walls of the bore of the nylon bushings of the vehicle and to hold the plate 10 securely but temporarily on the vehicle, without regard to the make or model of the vehicle or the wear condition of the bushings. In other words, the screw form of the threaded end 32 is adapted to fit all known vehicle types, and thus a plate 10 fitted with such fasteners 14 can be installed on any vehicle without having to locate or change the mounting screws or use a screw driver or other tool to secure the plate for transport of the vehicle.

The screw pattern was developed to have the following parameters shown to perform satisfactorily in various bushing types. The taper of a body section 36 and tapered threads 34 extending about the body section should be in the range of 5 to 9 degrees, and preferably 7 degrees. The threads 34 preferably have a thread height of 0.04 inches and a count of 10 threads per inch. The threads are preferably flattened rather than having pointed peaks of the threads with a preferred thread width of 0.020 inches. However, pointed peak threads are contemplated by the invention. The screw 14 can be fabricated of metal, such as die cast zinc, or plastics material, such as Ryton PPS, glass-filled nylon, polycarbonate, or the like. The lead of the helical threads enables the threaded portion to be fully extended into the bore in no more than 2.5 turns of the fastener 14.

To limit the depth of insertion of the screw threads, the unthreaded portion 16 is formed with a stop flange 50. The flange 50 is greater in diameter than the threads 24, but sufficiently small to pass through the fastener holes 12 of the license plate 10. The stop flange 50 confronts the bushing 15 and thereby acts to support the license plate 10 in outwardly spaced relation to the mounting bushing 15 and isolates the 22 grommet 22 against axial compression from fully tightening the fastener 14, as seen in FIG. 4.

The invention thus contemplates a thumb screw fastener having a captured resilient grommet with spaced flanges for fixing the grommet and thus capturing a screw in the aperture of a plate, and having the described thread form. The invention further contemplates the combination of such a screw with a license plate.

The disclosed embodiment is representative of a presently preferred form of the invention, but is intended to be illustrative rather than definitive thereof. The invention is defined in the claims.

What is claimed is:

1. A mounting kit for releasably securing a license plate to a vehicle, comprising:
   a pair of fasteners each having a fastener head and a shank extending axially from said head to a free end, said shank having a tapered body portion that narrows toward said free end of said shank, said tapered body portion having helical screw threads formed about said body portion, said helical screw threads being tapered with said body portion such that said threads are narrowest at said free end of said shank, said shank including an unthreaded portion disposed between
   a grommet fabricated of elastically deformable material disposed on said unthreaded portion of each fastener between said fastener head and said screw threads, each of said fasteners being rotatable relative to said associated grommet, each grommet having a nose end flange adjacent said screw threads and an upper flange adjacent said fastener head spaced from said nose end flange to define an annular slot therebetween, said nose end flange of each said grommet being extendible through an associated fastener opening in the license plate in order to capture each said grommet and each said fastener in the associated fastener openings of the license plate while supporting said fasteners for rotation relative to their associated said grommet and the license plate; and a stop flange formed on said unthreaded portion having an outer diameter greater than that of said screw threads for engaging an associated bushing of the vehicle provided for mounting the license plate on the vehicle to limit the depth to which said tapered body portion can be threaded into the associated busing and further isolating said grommet from axial compressive forces resulting from the tightening of the fastener when said stop flange is fully engaged with the bushing.

2. The mounting kit of claim 1 wherein said fastener head includes a pair of wing projections engageable by fingers of a user for turning said fastener by hand without the assistance of tools.

3. The mounting kit of claim 1, wherein said outer diameter of said stop flange is smaller than a maximum outer diameter of said nose end flange of said grommet.

4. The mounting kit of claim 1, wherein said nose end flange includes flats to facilitate elastic deformation of said nose end flange during passage of said nose end flange through the associated fastener opening in the license plate.

5. The mounting kit of claim 1, wherein said screw threads have flat outer surfaces.

6. The mounting kit of claim 1, wherein said screw threads have a pitch that enables the fasteners to be fully installed in a bore to the depth of said screw threads in no more than 2.5 turns of said fastener.

7. The mounting kit of claim 6, wherein each said fastener includes a stop flange formed on said unthreaded portion extending radially outwardly said screw threads to limit the depth of insertion of said fasteners.

8. A license plate mounting assembly, comprising:
   a license plate having a pair of fastener holes;
   a pair of fasteners each having a fastener head and a shank extending axially from said head to a free end, said shank having a tapered body portion that narrows toward said free end of said shank, said tapered body portion having helical screw threads formed about said body portion, said helical screw threads being tapered with said body portions such that said threads are narrowest at said free end of said shank, said shank including an unthreaded portion disposed between said head and said body portion, said fastener head including a pair of wing projections engageable by fingers of the user for turning said fasteners by hand and and a stop flange formed on said unthreaded portion;
   a pair of grommets captured in said fastener holes in said license plate by opposed flanges extending radially outwardly of the fastener openings on opposite sides of the license plate, each grommet having a central opening to receive a respective one of said fasteners, said fasteners being captured within said grommets by engagement of said grommet about said unthreaded body portion with a lower end of said grommet engaging said stop flange, said fasteners being rotatable relative to said grommets and said license plate and said grommets being isolated against axial compression from full tightening of the fasteners when the license plate is mounted on a vehicle by engaging of said stop flange with associated support structure of the vehicle.

9. The assembly of claim 8, wherein said stop flange has an outer diameter no greater than the diameter of said fastener openings in said license plate.

10. A method of mounting a license plate on a vehicle, comprising capturing elastic grommets in an associated pair of fastener openings formed in the license plate;

extending a threaded end of a fastener through the grommet and capturing the fasteners axially within the grommet while enabling the fastener to rotate relative to the grommet and license plate;

extending a screw end of the fasteners into associated bores of the vehicle and rotating the fasteners relative to the grommets and license plate to advance the screw thread end of the fasteners into the vehicle to removably secure the license plate to the vehicle in spaced relation to the vehicle and without compression of the grommet resulting from full tightening of the fasteners.

11. The method of claim 10, including forming the threaded ends such that the threaded ends fully inserted with no more than 2.5 turns of the fastener.

* * * * *

UNITED STATES PATENT AND TRADEMARK OFFICE
CERTIFICATE OF CORRECTION

PATENT NO.   : 6,871,431 B2
DATED        : March 29, 2005
INVENTOR(S)  : Tyson Schmidt It is certified that error appears in the above-identified patent and that said Letters Patent is hereby corrected as shown below:

Column 3,
Line 55, after "between" insert therein -- said head and said body portion --.

Column 4,
Line 46, "hand and" delete "and".
Line 60, after "vehicle by" delete "engaging" and insert therein -- engagement --.

Signed and Sealed this

Sixth Day of September, 2005

JON W. DUDAS
*Director of the United States Patent and Trademark Office*